Sept. 30, 1924.                                                                    1,509,985
J. SLEPIAN
ACCELERATING SYSTEM FOR INDUCTION MOTORS
Filed Nov. 28, 1919
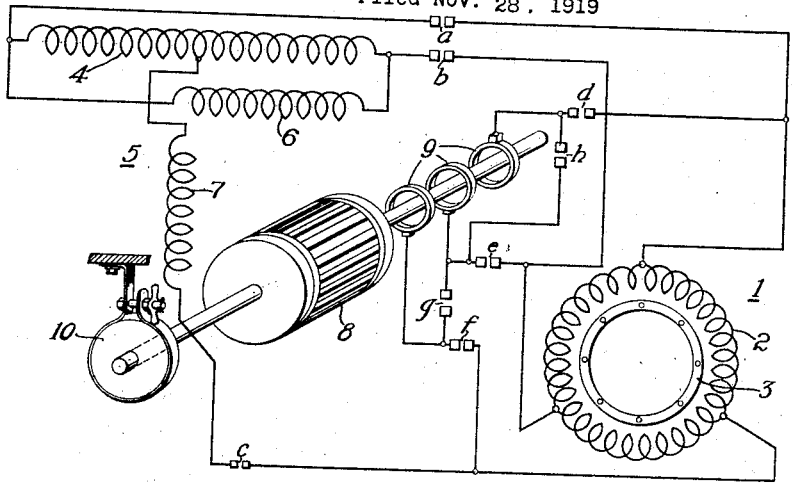
Fig. 1.
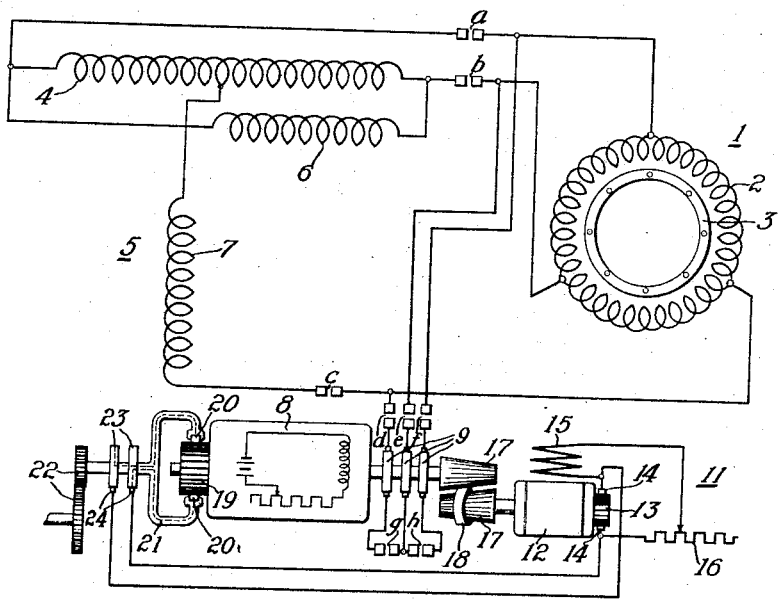
Fig. 2.
Fig. 3.
| Positions | a | b | c | d | e | f | g | h |
|---|---|---|---|---|---|---|---|---|
| Accelerating | | | | o | o | o | | |
| Transition | o | o | | | | | | |
| Transition | o | o | | | | | o | o |
| Running | o | o | o | | | | o | o |
WITNESSES:
H. T. Shelhamer
A. A. Brand
INVENTOR
Joseph Slepian
BY
Wesley G. Carr
ATTORNEY Patented Sept. 30, 1924.

1,509,985

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ACCELERATING SYSTEM FOR INDUCTION MOTORS.

Application filed November 28, 1919. Serial No. 340,986.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Accelerating Systems for Induction Motors, of which the following is a specification.

My invention relates to accelerating systems for induction motors and it has particular relation to systems for accelerating motors of the character designated in which the motors are of the polyphase type and derive energy from a single-phase line through an intermediate dynamo-electric machine of the phase-converter type.

In the accompanying drawing, Figure 1 illustrates diagrammatically the circuits used and the machines necessary to practice my invention; Fig. 2 illustrates a modification of the system shown in Fig. 1, and Fig. 3 is a switching sequence chart which is applicable to both of the systems shown.

When induction motors are supplied with low-frequency currents for starting, control and switching apparatus of a more or less complicated nature is necessary, and, when the motors are of the polyphase type and derive energy from a single-phase source, through a phase converter, the complications just noted are intensified because of the necessity for regulating the phase converter, as dictated by certain circumstances hereinafter pointed out.

I propose, therefore, to so associate a braking means with the phase converter which is used in the system above described that currents of suitable frequency may be supplied to an induction motor for accelerating the same. Moreover, I propose to so connect braking means which is used to reduce the speed of the phase converter and, therefore, to regulate the frequency of such currents as may be drawn therefrom in such manner that the excess energy which is drawn from the single-phase source may be returned to the system at proper frequency.

Referring more particularly to the drawing, an induction motor 1 comprises a wound stator member 2, and a squirrel-cage rotor member 3. The motor 1 is connected to derive polyphase currents from a single-phase source here represented as a secondary winding 4 of a transformer, through the interposition of a phase converter 5 comprising quadrature-positioned field windings 6 and 7 and a wound rotor member 8, the winding 8 being connected to slip rings 9.

A brake 10 is shown as associated with the rotating member 8 of the phase converter, and it is to be understood that the illustration here shown is merely representative, any desirable form of mechanical or electrical brake being suitable for the system disclosed in this figure, although, in further extending my invention to include the return of the excess energy drawn from the source to the system, it is necessary to utilize machines, as I will hereinafter describe in connection with Fig. 2.

Switches $a$, $b$ and $c$ are positioned in the leads connecting the primary winding of the phase converter with the induction motor winding 2, while switches $d$, $e$ and $f$ are positioned in the leads connecting the aforesaid winding 2 with the slip rings 9 or the rotatable winding of the converter, and, finally, switches $g$ and $h$ serve to short circuit the winding 8 of the converter for purposes to be hereinafter described.

Assuming that the phase converter is running at syncronous speed, the switches are operated as indicated in Fig. 3, switches $a$, $b$ and $c$ being open and switches $d$, $e$ and $f$ being closed, whereby the stator winding of the motor is connected to derive energy from the rotating or secondary winding of the converter. If now, the speed of the converter be reduced by any suitable braking means, currents of a low frequency will be supplied to start the motor. Upon additional braking forces being applied to the converter 5, currents of increasing frequency will be supplied to the motor-stator member, and, when the converter speed has been reduced to zero, currents of full line frequency will be flowing from the slip rings to the motor. It is then desirable to short circuit the winding 8 and to again raise the converter to synchronous speed, the switches $d$, $e$ and $f$ having been opened and the switches $a$, $b$ and $c$ having been closed, whereby the motor will derive energy directly from the primary member of the phase converter.

In Fig. 2, is shown a system in which all of that excess energy which is developed by reason of the braking of the converter speed is returned to the system at proper frequency.

In the system here shown, I provide an electrical braking means comprising a direct-current dynamo-electric machine 11. The machine 11 is provided with a commutated winding 12 connected to a commutator cylinder 13, upon which bear brushes 14, and a field winding 15, the current in which is adjusted by means of a rheostat 16.

The machine 11 is adapted to be driven by the rotating member of the phase converter 5 at varying speeds, as through a set of speed-changing cones 17, adjustment of a loosely-running belt 18 positioned between the cones resulting in any desired ratio between the converter speed and the speed of the machine 11.

The winding 8 of the phase converter is likewise connected to a commutator cylinder 19, upon which bear brushes 20—20, the latter being mounted in a frame 21 which is adapted for rotation by any suitable means, here indicated as a gear train 22. Inasmuch as the brushes 20—20 are rotated, it is necessary to derive the current therefrom through slip rings 23 and brushes 24, the latter being connected to the brushes 14—14 of the machine 11. All of the switches which were described in connection with Fig. 1 are likewise utilized, and have the same functions, in the system under consideration.

Assuming that the phase converter is running at synchronous speed, the machine 11 is connected mechanically thereto through the speed cone 17, and thereupon becomes a load or braking means, so reducing the speed of the phase converter that current of a low frequency, suitable for starting purposes, is supplied to the winding 2 of the motor. The machine 11 thereupon functions as a generator and develops power, the current therefrom being supplied to the commutator 19 and subsequently to the winding 8 of the phase converter.

However, the frequency of the current derived from the brushes 14—14 is zero, that is, the current is of the direct or uni-directional type and, therefore, it must be so adjusted that it is passed into the rotating member 8 of the phase converter at the correct frequency. This frequency variation is accomplished through the intermediary of the rotating brushes 20—20, the speed thereof being equal to synchronous speed, or, in other words, the brushes rotate at line frequency. A moment's consideration will demonstrate that constant rotation of the brushes 20—20 at synchronous speed will result in a correct transformation of the direct current derived from the machine 11 to the frequency necessary for supply to the phase converter, irrespective of the speed of the latter member. For instance, when the phase converter winding 8 is at standstill, current of line frequency will be derived from the slip rings 9 for supply to the motor winding 2, and, therefore, current of that frequency should be supplied at the brushes 20—20. Since the aforesaid brushes are rotating at synchronous speed, the direct current flowing from the machine 11 will be supplied to the phase converter at the proper frequency, as was indicated in connection with Fig. 2, and these currents may, therefore, be beneficially utilized in the system.

After the speed of the phase-converter secondary winding has been reduced to zero, and full line-frequency currents are being supplied to the motor winding 2, the motor is connected for single-phase energization from the source 4, and, during this short period, the phase converter is again being brought to synchronous speed. Finally, the secondary winding of the phase converter is short circuited for normal operation, and the full line-frequency currents are derived directly from the primary winding of the phase converter and supplied to the motor.

It will be apparent, therefore, to those skilled in the art that, by utilizing my system for acceleration of a polyphase induction motor from a single-phase source through the intermediary of a phase converter, smooth accelerating characteristics may be imparted to the system, and, moreover, the energy losses are reduced to a minimum by reason of the hereinbefore described method of returning the excess energy to the system.

While I have shown but two embodiments of my invention, I wish it to be understood that many other modifications therein may occur to those skilled in the art, whereby the functions above described may be secured without departing from the scope of the appended claims.

I claim as my invention:

1. In the combination of a source of single-phase energy, a phase converter, and an induction motor, the method of operating said motor which comprises running the converter at synchronous speed, while said motor is at standstill, then gradually reducing the speed of said converter and supplying the resultant current to the motor until, at standstill of said converter, current of line frequency is being fed to the motor, then feeding said motor direct from the single-phase source while bringing said converter to synchronous speed, and finally reconnecting said motor for polyphase energization through the interposition of the phase converter.

2. In combination with a frequency converter of the induction motor type, braking means for said converter comprising a direct-current dynamo-electric machine, and means comprising a commutator cylinder embodied in said phase converter and brushes movable relative thereto, whereby the energy developed during the braking operation may be returned to the system.

3. The combination with a frequency converter of the induction motor type, of means for changing the speed of said phase converter comprising a direct-current dynamo-electric machine mechanically connected thereto, and means comprising a commutator cylinder embodied in said phase converter and brushes in movable relation thereto, whereby the energy developed during the braking action may be returned to the system, the speed of said brushes being equal to the synchronous speed of the phase converter.

4. In combination with a single-phase source of energy, a phase converter of the induction-motor type embodying a wound secondary member provided with slip rings and a commutator cylinder, a polyphase translating device connected to said slip rings, means comprising a driven dynamo-electric machine for braking the speed of said phase converter, means for varying the speed relations of said phase-converter and said driven dynamo-electric machine, and means comprising movable brushes co-operating with the converter commutator for returning the excess energy drawn by said converter to the system, irrespective of the speed of said converter.

5. In combination with a single-phase source of energy, a phase-converter of the induction motor type embodying a wound secondary member provided with slip rings and a commutator cylinder, a polyphase translating device connected to said slip rings, means comprising a driven dynamo-electric machine for braking the speed of said phase-converter, means for varying the speed relations of said phase-converter and said driven dynamo-electric machine, means comprising movable brushes co-operating with the converter commutator, and means for running the same at the synchronous speed of said converter for returning the excess energy drawn by said converter to the system, irrespective of the speed of said converter.

6. In combination with a single-phase source of energy, a polyphase induction motor, an auxiliary induction machine having wound primary and secondary members, means for, at times, furnishing low-frequency energy to said motor from said secondary member, means for varying said frequency from zero to line frequency, means for operating said motor single-phase during certain transition periods, and means for, at other times, operating said auxiliary machine as a phase balancer connected between said single-phase source and said polyphase motor.

7. In combination with a single-phase source of energy, a phase-converter, a polyphase induction motor, means for changing the speed of said converter from synchronous speed to standstill and deriving therefrom energy of varying frequencies for accelerating said motor, switching means for operating said motor single-phase during the readjustment of the converter from standstill to synchronous speed, and further switching means for thereafter operating said converter at synchronous speed and supplying energy of line frequency to the motor.

8. A frequency converter of the induction-motor type, comprising primary and secondary windings, terminal conductors connected to said windings whereby electrical energy may be supplied to said primary windings and withdrawn from said secondary windings, or vice versa, the ratio of the frequencies of the currents in said primary and secondary windings being proportional to the slip, and means for controlling the slip, said means comprising a regulable direct-current machine, a mechanical connection between said machine and said converter, a commutator member associated with said secondary windings, rotatable brushes associated with said commutator member, means for rotating said brushes at synchronous speed with respect to said primary windings, and electrical connections between said brushes and said direct-current machine.

9. The combination with an asynchronous induction machine having a primary stator winding and a secondary rotor winding, of a direct current dynamo-electric machine, a commutator cylinder associated with said secondary windings, rotatable brushes associated with said commutator cylinder, means for rotating said brushes at synchronous speed, electrical connections between said brushes and said direct-current dynamo-electric machine, and a mechanical connection between the two machines.

10. The combination with an alternating-current, variable-speed dynamo-electric machine having a stationary field winding and a rotatable armature winding, of a commutator cylinder associated with said armature winding, rotatable brushes associated with said commutator cylinder, means for rotating said brushes at synchronous speed, a direct-current dynamo-electric machine electrically connected to said brushes, means for varying the relative electromotive-forces of said two machines, and a mechanical connection between the two machines.

In testimony whereof, I have hereunto subscribed my name this 18th day of November, 1919.

JOSEPH SLEPIAN.